ян
2,893,953

EQUILIBRIUM PRESSURE AUTOFINING WITH A SILICA-ALUMINA BASE AUTOFINING CATALYST

Roy Turner and Eric Arthur White, Sunbury-on-Thames, England, assignors to The British Petroleum Company Limited, London, England, a British joint-stock corporation No Drawing. Application August 7, 1956
Serial No. 602,522

Claims priority, application Great Britain August 17, 1955

2 Claims. (Cl. 208—214)

This invention relates to the catalytic desulphurisation of hydrocarbons, particularly petroleum hydrocarbons, by means of the autofining process.

The autofining process has been described in numerous patent specifications and the literature and its characterising feature is that the hydrogen required for desulphurisation is obtained by a limited dehydrogenation of the feedstock. The autofining process is normally carried out using a catalyst comprising the oxides of cobalt and molybdenum supported on an alumina base. In the equilibrium pressure autofining operation the reaction is operated under the conditions with which the present invention is of particular utility described in U.S. Patent No. 2,648,623. As set forth in Patent No. 2,648,623, in equilibrium pressure autofining the temperature is selected between 650–800° F. and the pressure is permitted to rise above p.s.i. ga. until the amount of hydrogen produced equals the amount of hydrogen consumed at which point the system is in pressure equilibrium. It has now been found that improved results may be obtained in the equilibrium pressure autofining operation by the use of a mixed silica/alumina base.

According to the invention therefore, an autofining process is carried out using a catalyst consisting essentially of the oxides of cobalt and molybdenum supported on a silica/alumina base.

The silica content of the catalyst may lie within the range 1 to 40% by weight of the catalyst, and preferably within the range 3 to 15% by weight.

The oxides of cobalt and molybdenum may be present as such, or in combined form, or both.

The invention will now be described with reference to the following example.

Example

A catalyst containing cobalt and molybdenum oxides on a mixed silica/alumina base was prepared in the following manner:

1,500 g. of aluminium nitrate $Al(NO_3)_3 9H_2O$ were dissolved in 2½ litres of distilled water. The solution was heated to 65° C. with constant stirring and 900 ml. of 0.88 strength ammonia solution added. The precipitate was separated by filtration and centrifuging. The filter cake was re-slurried in 7 litres of distilled water, heated almost to boiling and again filtered. This washing procedure was repeated using 5 litres of distilled water. The filter cake was re-slurried in a ball mill with 50 ml. of distilled water and left overnight.

36 g. of sodium silicate solution (specific gravity-1.7) were dissolved in 300 ml. of distilled water and to this was added a solution of 100 g. of aluminium nitrate $Al(NO_3)_3 9H_2O$ and 12 g. of cobalt nitrate $Co(NO_3)_2 6H_2O$ dissolved in 150 ml. of distilled water. 100 ml. of ammonia solution were added and the precipitate filtered. The filter cake was re-slurried with 750 ml. of water, heated to boiling and again filtered. This washing procedure was repeated twice, and the cake finally washed with 750 ml. of cold distilled water. The washed cake was added to the contents of a ball mill together with 31 g. of molybdic acid, $H_2MoO_4$, and the slurry milled for 3 hours. The slurry was then filtered, dried at 40° C. for 30 hours, 70° C. for 8 hours, 100° C. for 8 hours and finally roasted at 550° C. for 2 hours.

The catalyst prepared in the above manner had the following analysis:

$MoO_3$ ---- 12.3 g./100 g. on material stable at 1020° F.
$CoO$ ---- 1.8 g./100 g. on material stable at 1020° F.
$SiO_2$ ---- 4.9 g./100 g. on material stable at 1020° F.

425 g. of the above catalyst were charged to a reactor and an autofining run carried out under the following conditions:

Feedstock—straight run gas oil having a specific gravity at 60° F./60° F. of 0.8435, an ASTM distillation range of 248 to 359° C. and containing 1.29 percent weight sulphur.
Temperature—780° F.
Pressure—equilibrium.
Space velocity—2.0 v./v./hr.
Recycle gas rate—2000 s.c.f./b. set at 100 p.s.i.g.

The sulphur contents of the liquid products obtained during the course of this run are given in Table 1.

A second run was carried out under the same conditions as above but using a catalyst consisting of cobalt and molybdenum oxides on alumina containing no silica. The sulphur contents of the liquid products obtained from this run are also given in Table 1.

It will be seen that more sulphur is removed by the catalyst containing silica.

Table 1

| | Sulphur content of liquid product (percent wt.) at— | | | | | |
|---|---|---|---|---|---|---|
| | 25 hr. | 50 hr. | 75 hr. | 100 hr. | 125 hr. | 150 hr. |
| Catalyst with silica | 0.10 | 0.21 | 0.37 | 0.47 | 0.63 | 0.76 |
| Catalyst without silica | 0.30 | 0.46 | 0.60 | 0.65 | 0.72 | 0.74 |

We claim:
1. A process for the catalytic desulphurisation of petroleum hydrocarbons under equilibrium pressure autofining conditions comprising contacting the petroleum hydrocarbon in a reaction zone with a dehydrogenation-hydrogenation catalyst and hydrogen derived solely from the petroleum hydrocarbon at a temperature between about 650–800° F., and allowing the pressure to rise above 100 p.s.i. ga. to an equilibrium pressure at which the amount of hydrogen evolved equals the hydrogen consumed, said catalyst consisting essentially of the oxides of cobalt and molybdenum supported on a mxed silica-alumina base in which the silica content is within the range 1–40% by weight, and recovering a petroleum hydrocarbon of reduced sulphur content.

2. A process in accordance with claim 1 in which the silica content lies within the range 3 to 15% by weight.

References Cited in the file of this patent

UNITED STATES PATENTS 2,591,525    Engel et al. ---------------- Apr. 1, 1952
2,769,755    Porter et al. ---------------- Nov. 6, 1956

UNITED STATES PATENT OFFICE
CERTIFICATION OF CORRECTION

Patent No. 2,893,953                  July 7, 1959

Roy Turner et al.

It is hereby certified that error appears in the above numbered patent requiring correction and that the said Letters Patent should read as corrected below.

Column 1, line 34, after "above" insert -- 100 --; column 2, line 61, for "mxed" read -- mixed --.

Signed and sealed this 13th day of June 1961.

(SEAL)
Attest:

ERNEST W. SWIDER
Attesting Officer

DAVID L. LADD
Commissioner of Patents